Oct. 23, 1951   J. W. ASHLEY ET AL   2,572,091
HEEL SLOTTING MACHINE

Filed Aug. 4, 1950   6 Sheets-Sheet 1

Fig.1.

Inventors
John W. Ashley
James F. Leahy
By their Attorney

Oct. 23, 1951     J. W. ASHLEY ET AL     2,572,091
HEEL SLOTTING MACHINE Filed Aug. 4, 1950     6 Sheets-Sheet 2

Inventors
John W. Ashley
James F. Leahy
By their Attorney

Oct. 23, 1951     J. W. ASHLEY ET AL     2,572,091
HEEL SLOTTING MACHINE Filed Aug. 4, 1950     6 Sheets-Sheet 3

Fig. 3.

Inventors
John W. Ashley
James F. Leahy
By their Attorney

Oct. 23, 1951   J. W. ASHLEY ET AL   2,572,091
HEEL SLOTTING MACHINE

Filed Aug. 4, 1950   6 Sheets-Sheet 6

Inventors
John W. Ashley
James F. Leahy
By their Attorney

Patented Oct. 23, 1951

2,572,091

UNITED STATES PATENT OFFICE 2,572,091

HEEL SLOTTING MACHINE

John W. Ashley and James F. Leahy, Beverly, Mass., assignors to United Shoe Machinery Corporation, Flemington, N. J., a corporation of New Jersey Application August 4, 1950, Serial No. 177,649

15 Claims. (Cl. 12—42)

1

This invention relates to slotting machines and is illustrated as embodied in a machine for forming in the attaching faces of wood heels cross slots for preparing said heels for attachment to shoes by the practicing of a method such as disclosed in an application for Letters Patent of the United States Serial No. 43,046, filed August 7, 1948, in our names.

The present invention provides a novel machine comprising a turret in which the heel can be quickly and effectively positioned and clamped and a rotary circular saw movable in a rectilinear path to form in the attaching face of the heel, moved together with the turret to two different indexed positions, the above-mentioned cross slots. By the use of the illustrative machine the angle between the cross slots may be varied in accordance with the size and shape of the heel and the general planes of the said slots may be varied with relation to the plane of the rim of the attaching face of the heel. In order to insure against damage to the machine means is provided for rotating the saw only when the machine is in one of its indexed positions, the saw after the formation of one slot remaining at rest until after a member has been manually actuated, such actuation usually being effected after the heel has been positioned and clamped in the machine. The present invention consists in novel features hereinafter described, reference being had to the accompanying drawings which illustrate one embodiment of the same selected for purposes of illustration, said invention being fully disclosed in the following description and claims.

In the accompanying drawings.

2

Figures 2, 12:
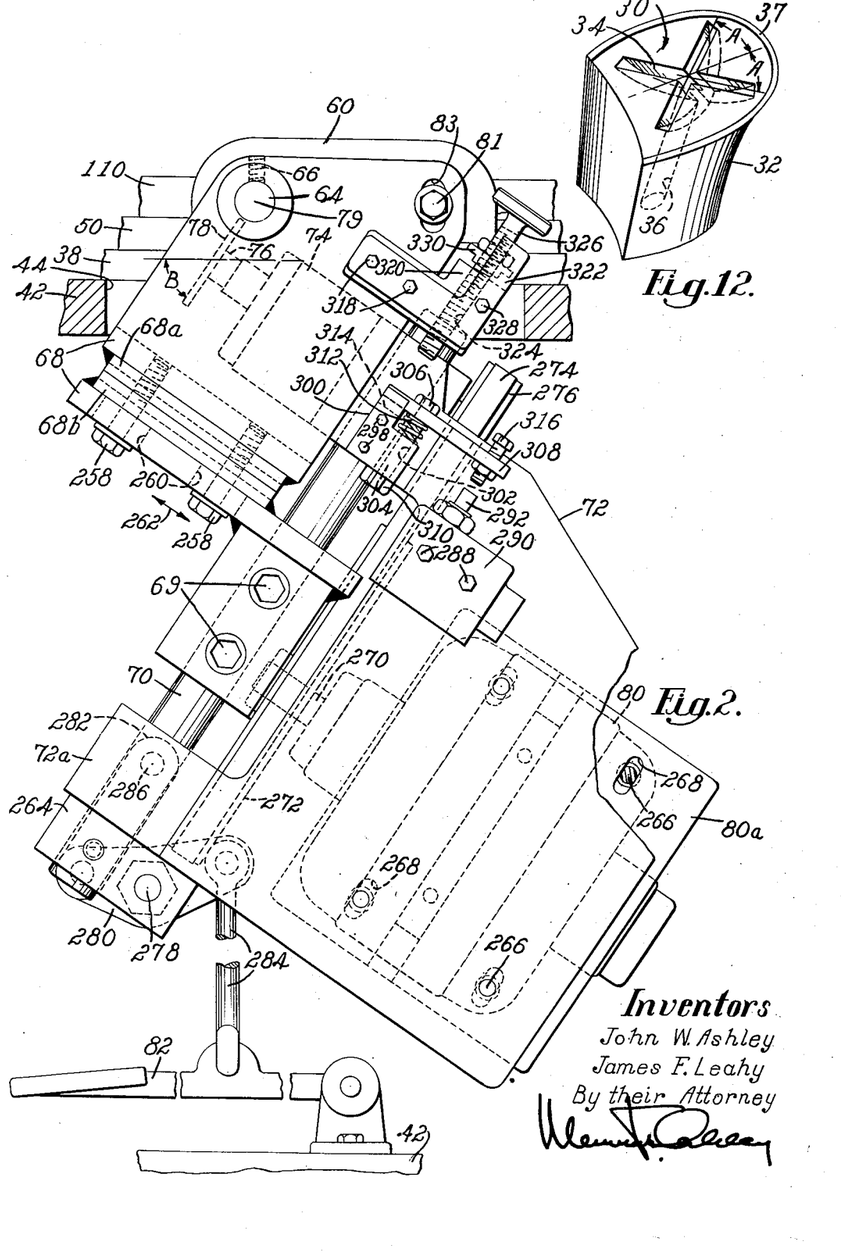
Fig. 2 is a side elevation, partly broken away, of the machine.
Fig. 12 shows in perspective a heel which has been slotted by the use of the machine.

The illustrative machine is described with reference to forming in the attaching face 30 (Figs. 12, 13 and 14) of a wood heel 32 before the heel has been covered, cross slots 34 which are used in the attachment of said heel to a shoe in accordance with the method disclosed in said application Serial No. 43,046. In practicing the above-mentioned method there is formed in the heel 32 either before or after the formation of said slots 34 a passage 36 which extends heightwise of the heel and opens into intersecting portions of the slots. If desirable, the slots 34 may be formed after the heel has been covered in which event a dust collector (not shown) is used with the machine to insure against dust being deposited upon the cover of the heel. After the heel has been prepared for attachment to the shoe and has been forced with heavy pressure against a prepared heel seat (not shown) of the shoe, viscous thermoplastic resin is injected through the passage 36 and into the slots 34 as well as into voids formed between the heel and the heel seat of the shoe and into undercut cavities (not shown) formed in said heel seat. The heel 32 is held under heavy pressure against the heel seat of the shoe until the resin hardens and shrinks, the resin serving as a rivet to secure the heel permanently to the shoe.

It is desirable to vary the lengths of the slots 34 as well as the angle 2A formed between said slots and the height-wise median plane 35 of the heel in accordance with the size and/or style of the heel. Moreover, it is desirable to vary the angle at which the slots 34 are disposed in relation to the plane of the rim 37 of the attaching face 30 of the heel in order to vary the "anchoring effect" of the thermoplastic resin rivet in the heel.

Figure 4:
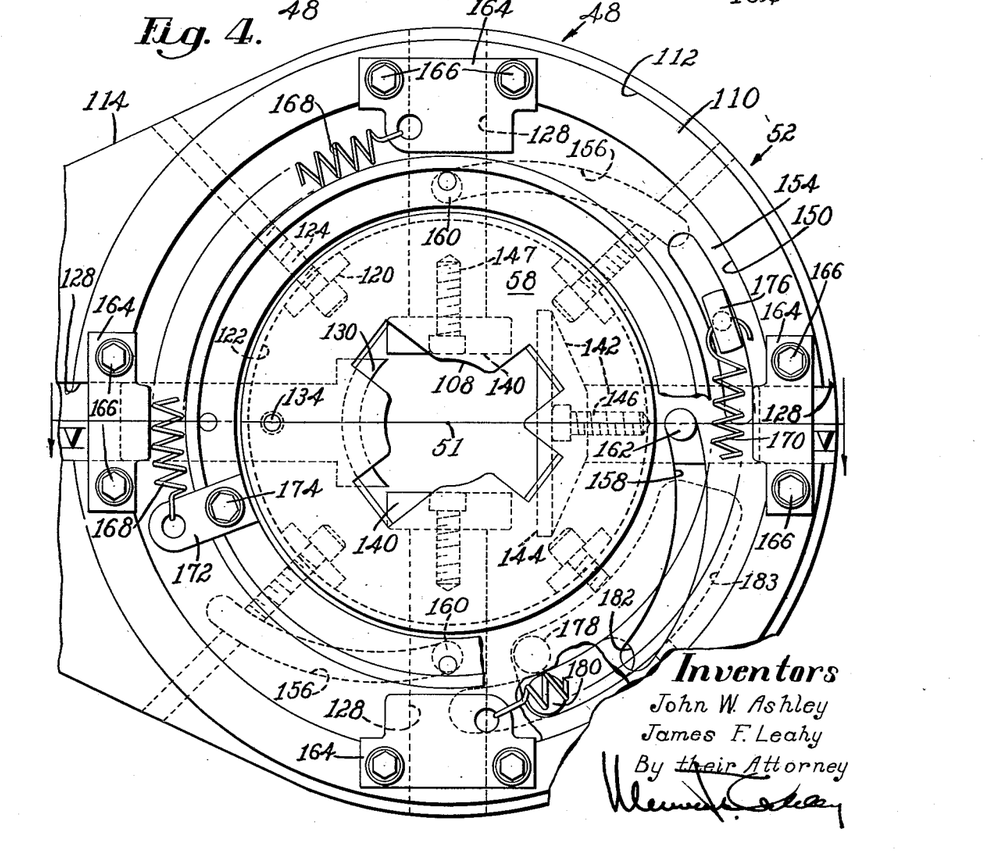
Fig. 4 is a bottom view of the turret.
Figure 5:
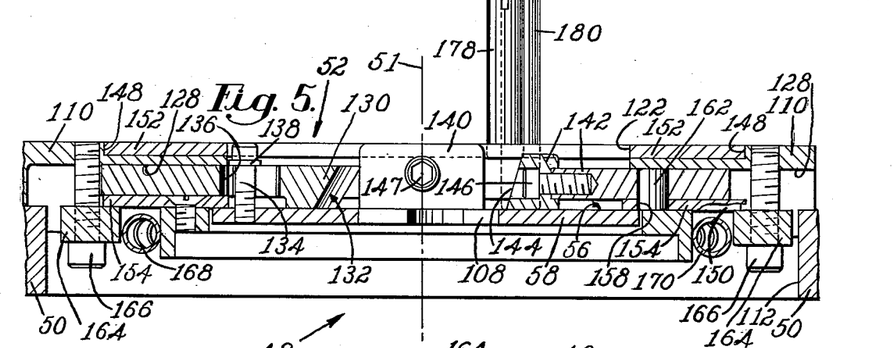
Fig. 5 is a section on line V—V of Fig. 4.
Figure 6:
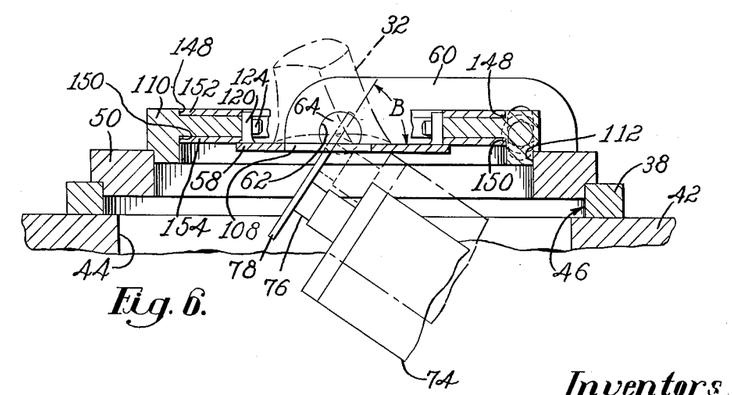
Fig. 6 is a section on line VI—VI of Fig. 3 illustrating portions of the turret and a saw during the heel slotting operation.
Figure 7:
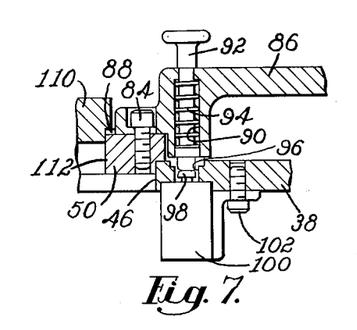
Figs. 7, 8 and 9 are sections on lines VII—VII, VIII—VIII and IX—IX, respectively, of Fig. 3.
Figure 8:
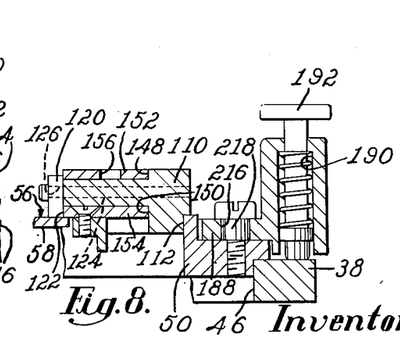
Figure 9:
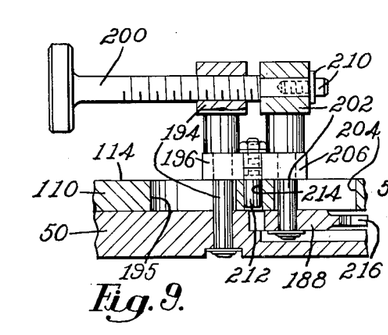

The operative parts of the illustrative machine are supported by a fixed plate or support 38 secured by screws 40 (Figs. 1 and 3) to a table 42 which has formed in it an opening 44 bridged by the plate. The plate 38 may be considered as part of the table 42. Formed in the plate 38 is a cylindrical bore or recess 46 (Figs. 6, 7 and 8) which is centered about a vertical axis 51 (Figs. 3, 4 and 5) and in which fits a turret 48 (Figs. 1 and 5) comprising a ring or annulus 50, a heel supporting and positioning unit or work carrier 52, and a clamp 54 (Figs. 1 and 10) which is carried by said unit and is constructed and arranged to force the heel supported and positioned in the unit with considerable pressure against a heel supporting face 56 (Figs. 3, 5 and 8) of a platen or support 58 forming part of the unit. The vertical axis 51 may be described as extending generally heightwise of the heel positioned and clamped in said unit and the ring 50 and the heel positioning and clamping unit 52 may be referred to as a carrier.

The fixed plate 38 has formed integral with it at its opposite sides, upstanding flanges 60 (Figs. 1, 2, 3 and 6) having cylindrical bores 62 in which fit for angular adjustment bearing pins 64. Secured by screws 66 to the bearing pins 64 is a multipart bracket 68 to which are clamped by screws 69, 71 (Fig. 1) long and short guide rods 70, 70a respectively. Mounted for reciprocation upon the guide rods 70, 70a at an angle B (Figs. 2 and 6) to the horizontal heel supporting surface 56 of the platen 58 is a slidable carriage 72 (Figs. 1 and 2) to which is welded a bearing 74 (Figs. 2 and 6) for a shaft 76. A circular saw or cutter 78 is secured to the shaft 76, an electric motor 80 and driving mechanism hereinafter described being provided for operatively connecting the motor to the saw. For reasons which will be hereinafter explained, the bracket 68 may be secured to the flanges 60 of the fixed plate 38 in different angular adjusted positions about an axis 79 of the bearing 64 by screws 81 (Figs. 2 and 3) which are threaded into said flanges and pass through arcuate slots 83 in the bracket.

Figure 11:
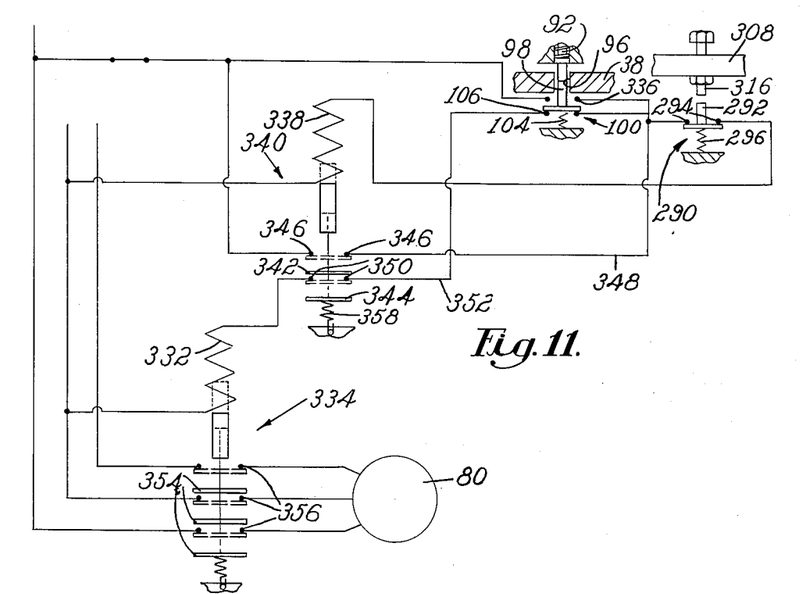
Fig. 11 is a wiring diagram for the illustrative machine.

When the heel 32 has been positioned and clamped in the unit 52, as will be hereinafter explained, the slidable carriage 72 is raised a predetermined distance along the rods 70, 70a upon depression of a treadle 82 (Fig. 2) to cause the saw 78 to form one of the slots 34 in the attaching face 30 of the heel 32. The turret 48 which includes the heel positioning and clamping unit 52 is then swung through an angle supplemental to twice the angle A to another indexed position and is held in said position while the slidable carriage 72 is again raised along the rods 70, 70a to form the other of said slots 34. The turret 48 which comprises the outer ring 50 has secured to it by a screw 84 (Figs. 1 and 7) a handle 86 which fits in a slot 88 of the ring 50. Slidable in a bore 90 (Fig. 7) of the handle 86 is a plunger 92 which is constantly urged downward by a spring 94, a lower end of the plunger, when the ring 50 of the turret 48 has been swung into the angular position shown in Fig. 3, registering in a recess 96 (Figs. 7 and 11) in the fixed plate 38. Slidable in the recess 96 of the base plate 38 is a switch bar 98 of a switch or microswitch 100 secured by one or more screws 102 to said plate, said bar being biased upward by a spring 104 (Fig. 11) from a bridging position across terminals 106, the construction and arrangement, as will be hereinafter explained, being such that when the bar is raised by the spring 104 away from the terminals 106 the motor 80 is deenergized.

Figure 13:
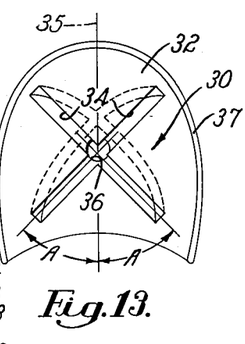
Figs. 13 and 14 are plan views of heels of different sizes and styles which have been slotted by said machine.
Figure 14:
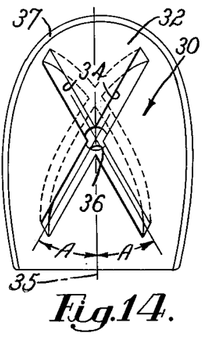

The heel supporting platen 58 has formed in it an X-shaped opening 108 (Figs. 3, 4, 5 and 6) which is shaped and arranged to permit to move through it the circular saw 78 when said turret is indexed between extreme positions in which the slots 34 formed are disposed at right angles to one another as shown in Fig. 13, and other extreme positions in which said slots are disposed at 60° to each other as shown in Fig. 14. It will be noted that the platen 58 affords adequate support for the smallest sizes of narrow-style heels, and for the largest sizes of wide-style heels, the platen being cut away only sufficiently to permit passage through it of the cutter 78 at different indexed positions of said turret 48. As illustrated the angle B between the general plane of reciprocation of the saw 78 and the surface 56 of the platen 58 is commonly about 45 degrees and may be varied substantially without changing the platen 58.

The ring 50 has mounted upon it for rotation about the axis 51 a carrier 110 which supports and forms part of the heel supporting and clamping unit 52. The carrier 110 fits slidingly in a circular recess 112 of the ring 50 and overlies the upper surface of said ring, a yoke 118 being secured by screws 116 to an overhanging portion 114 of the carrier. The platen 58 has formed integral with it four upstanding lugs 120 (Figs. 3, 4, 6 and 8) which are arranged against a cylindrical wall 122 of the carrier 110 and are secured to said wall by radially arranged screws 124 extending through bores 126 (Figs. 3 and 8) of said lugs and threaded into the carrier. The platen 58 and the cylindrical wall 122 of the carrier 110 form a recess into which the heel 32 is placed with the rim 37 of its attaching face 30 in engagement with the face 56 of the platen.

The carrier 110 has formed in its guideways 128 (Figs. 1, 3, 4, and 5) which are radially arranged with relation to the axis 51. Mounted for initial radial adjustment in one of the guideways 128 is a rear gage 130 which has an undercut circular face 132 (Fig. 5) shaped and arranged to be engaged by the upper rear end of the heel. The rear gage 130 is held in an adjusted position in its guideway 128 by a screw 134 which is threaded into the platen 58, passes through an elongated slot 136 (Figs. 3 and 5) of the gage and forces a washer 138 against the upper face of said gage. Mounted for reciprocation in associated guideways 128 are side or centralizing and breast gages 140, 142 respectively, the breast gage 142 having an interchangeable heel engaging portion 144 which is secured to the main portion of the breast gage by a screw 146. Heel engaging faces of the side gages 140, which comprise guide and head portions secured together by screws 147, are vertically arranged with relation to the face 56 of the platen 58 and are constructed and arranged to engage the opposite sides of the rim of the attaching face 30 of the heel 32.

Formed in the carrier 110 are circular guideways 148, 150, respectively, in which rotatably fit cam plates 152, 154 provided with cam slots 156, 158, into which extend pins 160, 162 (Figs. 3 and 4) secured to the side and breast gages 140, 142. The guideways 128 are formed in part by retaining plates 164 (Figs. 4 and 5) which straddle the outer ends of the guideways 128 and are secured to the carrier 110 by screws 166.

The side and breast gages 140, 142 are constantly urged toward each other by springs 168, 170, respectively, opposite ends of the spring 168 being attached to one retaining plate 164 and to an arm 172 (Fig. 4) secured by a screw 174 to the cam plate 154 and the opposite ends of the spring 170 being attached to the other retaining plate 164 and to a depending lug 176 of the cam plate 152. It will be apparent that when the inner ends of the slots 156, 158 engage the pins 160, 162 the side and breast gages are in their closed positions shown in Figs. 3 and 4. In order to move the side and the breast gages 140, 142 away from one another against the action of the springs 170, 168, respectively, preparatory to placing the heel upon the platen 58 and overlying the X-shaped opening 108 the cam plates 152, 154 have secured to them upstanding gage operating handles 178, 180 positioned adjacent to each other, the cam plate 152 and the carrier 110 being provided with elongated arcuate clearance slots 182, 183 through which the handle 180 extends.

The carrier 110 is held against vertical displacement on the ring 50 by a pair of retaining lugs 184 (Figs. 1 and 3) which are secured by screws 186 to said ring and have their lower faces in engagement with the upper face of the carrier. There is operatively connected, by mechanism hereinafter described, to the carrier 110 an index arm 188 (Figs. 1, 3, 8 and 9) having a recess 190 (Fig. 8) in which is mounted for reciprocation a spring-pressed plunger 192 which is similar to the plunger 92 and the lower portion of which is constructed and arranged to fit in the recess 96 of the fixed plate 38 when the turret 48 has been indexed to the proper position upon said plate thereby causing the switch bar 98 of the microswitch 100 to be depressed. The recess 96 and the plungers 92, 192 may be referred to as interlocking or latch parts.

In order to vary the angle 2A formed between the slots 34 while maintaining the angles A equal in accordance with the size and/or the style of the heel 32, it is necessary, as will be hereinafter explained, first to vary in a predetermined relation the angular position of the index arm 188 with relation to the carrier 110 and also to vary in a predetermined relation the position of said arm and said carrier with relation to the ring 50 and the plunger carrying operating handle 86 thereof. In order to use, in a machine having a saw 78 reciprocable in a fixed plane, the single recess 96 (Figs. 7 and 11) in indexing the turret 48 to form slots 34 symmetrical with relation to the heightwise median plane 35 of the positioned and clamped heel and disposed at equal but variable angles to said plane, it is desirable in initially adjusting the machine that as the carrier 110 of the heel positioning and clamping unit 52 is moved X degrees in one direction about the vertical axis 51 the index arm 188 be moved 2X degrees in the same direction about such axis. With the foregoing considerations in view the following mechanism is provided. Pivotally mounted upon the ring 50 and passing through an arcuate slot 195 in the carrier 110 is an upstanding guide rod or journal 194 (Figs. 1, 3 and 9) upon which is pivotally mounted a link 196 and into an upper portion of which is threaded a manually operated adjusting screw 200. Pivotally mounted upon the index arm 188 is a guide rod or journal 202 a portion of which passes through an arcuate clearance slot 204 in the carrier 110 and rotatably fits in a bore in a link 206. Extending through and rotatable in an upper portion of the guide rod 202 is a nonthreaded portion of the screw 200, said screw having threaded into it a collared retaining screw 210 which cooperates with a shoulder of the rod 202 to insure against any lengthwise displacement of the rod with relation to the adjusting screw 200.

The links 196, 206 are of equal length and have alined bores in which rotatably fits a coupling pin 212 (Figs. 3 and 9), the lower end of which fits in a radial guideway or guide slot 214 of the carrier 110. The index arm 188 has an arcuate slot or guide 216 which is concentric with the vertical axis 51 and has fitted in it a shouldered guide screw 218 (Figs. 3 and 8) threaded into the ring 50. It will be clear that when the adjusting screw 200 is rotated in the bearing block 194 the carrier 110 is rotated X degrees about the axis 51 in one direction and the index arm 188 which is connected for arcuate movement with the guide block 202 is moved 2X degrees in the same direction about said axis. In order to insure that both of the slots 34 formed in the heel 32 shall slope rearward (Figs. 13 and 14) as they extend toward the tread end of the heel the turret 48 as above explained is indexed not through the angle 2A but through an angle supplemental to said angle. In order to use the common indexing recess 96 (Figs. 7 and 11) and the single microswitch 100 movable in said recess in adjusting the machine to form slots 34 having different angles 2A formed between them, the carrier 110 is initially rotated for setting-up purposes with relation to the ring 50 and accordingly the indexing handle 86 in one direction about the axis 51 one half the distance that the indexing arm 188 rotates about said axis with relation to the ring. The positions of the slots 34 lengthwise of the attaching face 30 of the heel 32 may be varied by changing the setting of the rear gage 130 in its guideway 128. It will be understood that the lengths of the slots 34 may be varied by increasing or decreasing the depths of said slots and/or by substituting for the saw 78 a saw having a different diameter.

Figure 1:
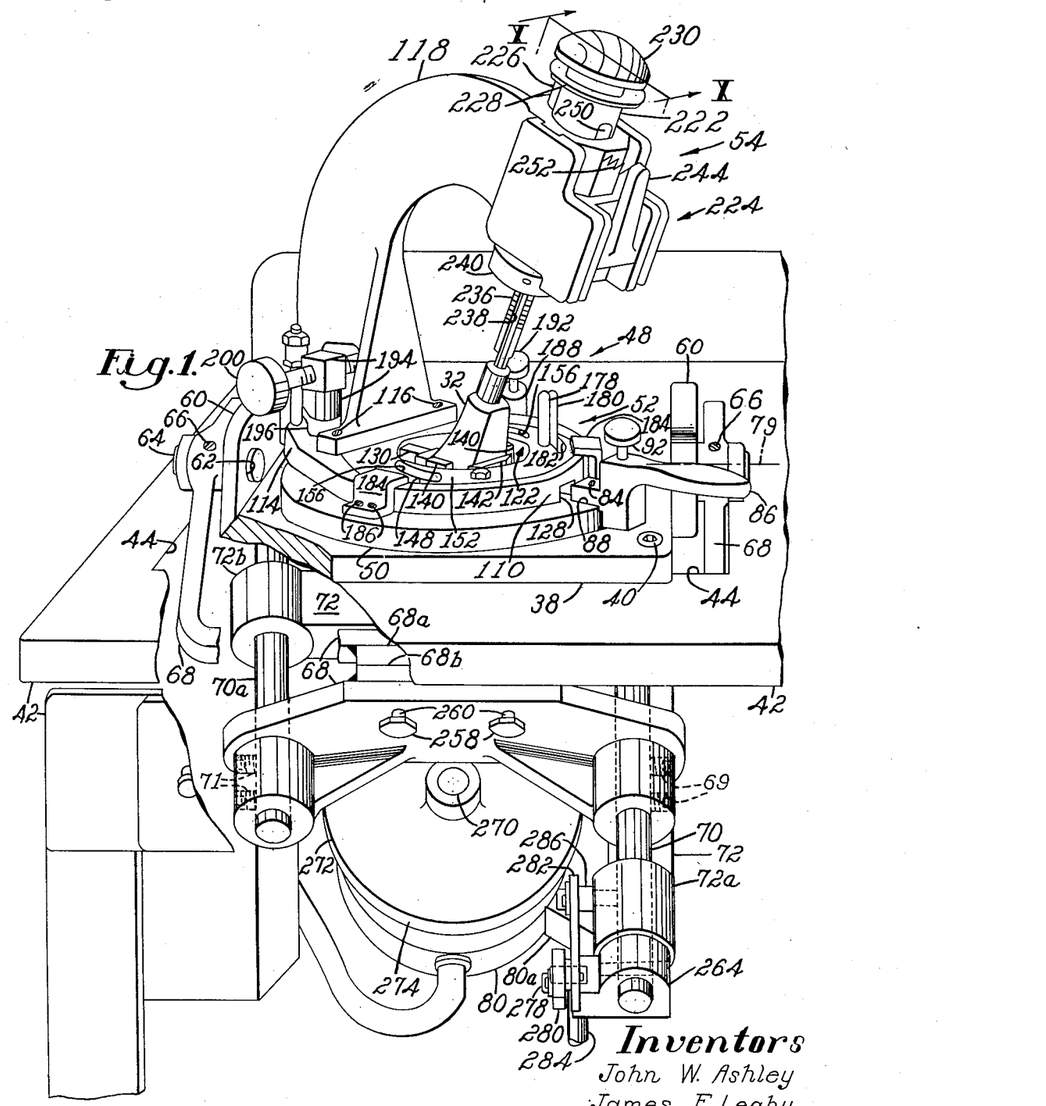
Fig. 1 is a perspective view, partly broken away, of the illustrative heel slotting machine.
Figure 3:
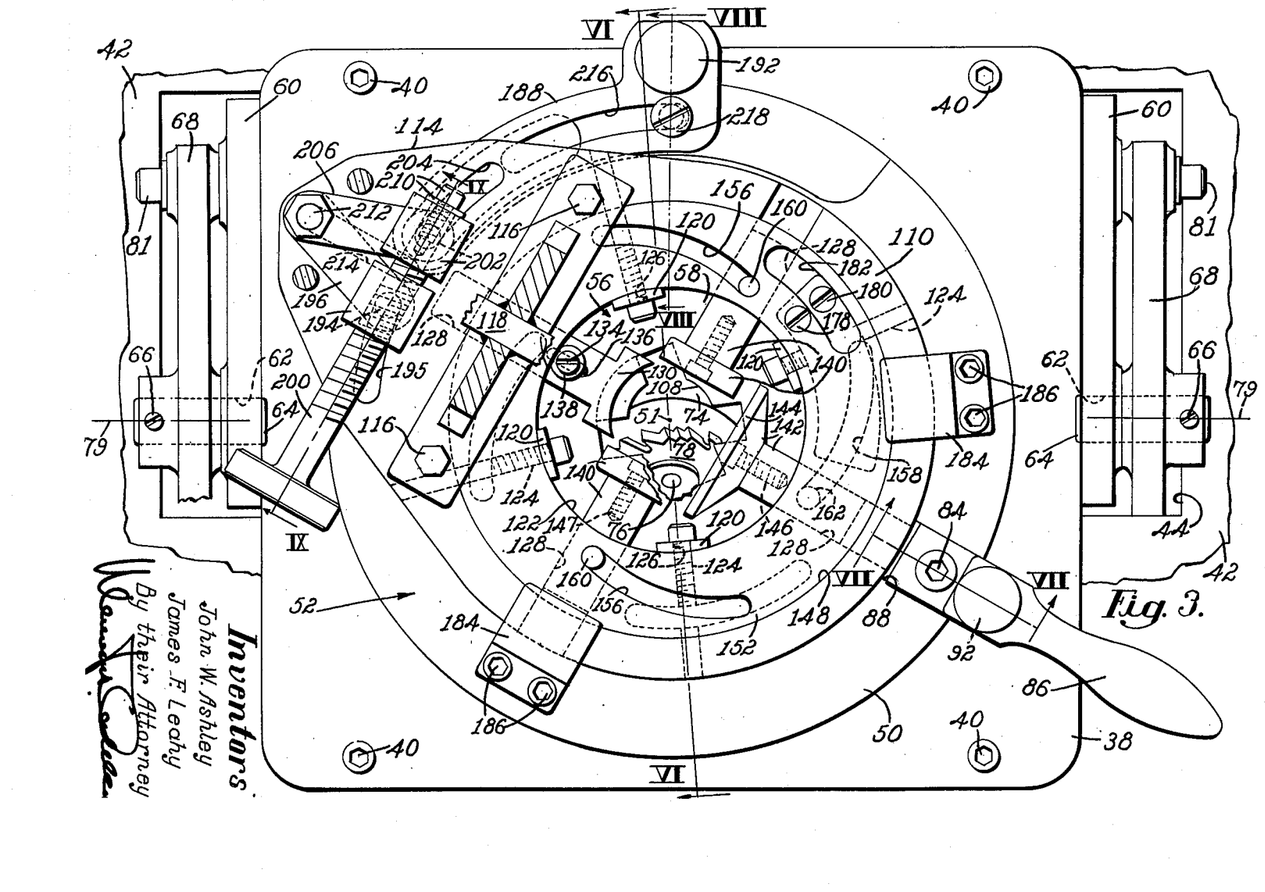
Fig. 3 is a plan view showing on an enlarged scale a work supporting and positioning turret of the machine.

Preparatory to placing the heel 32, attaching face 30 down, upon the platen 58 the operator moves the gage operating rods 178, 180 clockwise as viewed in Figs. 1 and 3 about the axis 51 thereby moving the side and breast gages 140, 142 away from each other to retracted positions. The heel 32 is then placed upon the platen 58 with its rear upper end in engagement with the rear gage 130 and the rods 178, 180 are released, the side gages 140 serving to centralize the heel upon the platen and the breast gage 142 thereafter forcing under spring action the rear upper end of the heel against the rear gage.

Figure 10:
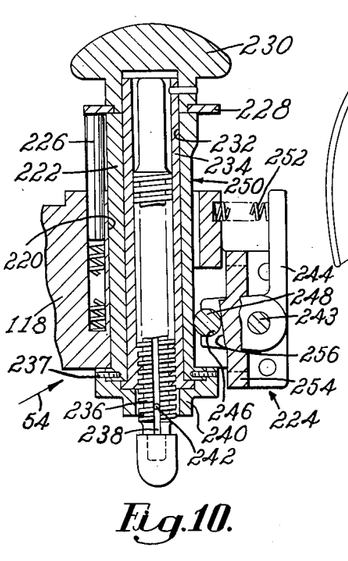
Fig. 10 is a section on line X—X of Fig. 1 showing in detail a clamp which is associated with and may be considered as part of the turret.

After the heel has been positioned in the machine it is secured in position by the clamp 54 (Fig. 1) which will now be described in detail. As best shown in Fig. 10 there is slidingly mounted in a cylindrical guideway 220 of the yoke 118 an outer sleeve 222 which when a Horton clutch 224 is released is moved to a raised position by a spring-pressed plunger 226 operating against a circular flange 228 secured to a hand grip 230. Rotatably mounted in a bore 232 of the outer sleeve 222 is an inner sleeve 234 which is pinned to the hand grip 230 and is internally threaded to receive an externally threaded plunger 236. The hand grip 230 and a flange at the lower end of the inner sleeve 234 engage the upper and lower ends respectively of the outer sleeve 222. Secured by screws 237 to the outer sleeve is a bracket 240 and secured to said bracket and fitting in a longitudinal channel 238 in the plunger 236 is a pin 242 for insuring against rotation of the plunger as the inner sleeve 234 is rotated. Rotation of the hand grip 230 and accordingly the inner sleeve 234 effects downward clamping movement of the plunger 236 with relation to the inner sleeve 234 to force said plunger against the heel. Upward movement of the outer sleeve 222 under the action of the spring-pressed plunger 226 is limited by the engagement of the bracket 240 and a lower flange of the sleeve with the yoke 118.

Pivotally mounted upon a pin 243 carried by the yoke 118 is an L-shaped lever 244 having bifurcations inner ends of which have cylindrical faces 246 with which a roller 248 engages rotatingly, the lever being constantly urged clockwise as viewed in Fig. 10 toward a flat face 250 of the outer sleeve 222 by a spring 252. Secured to the yoke 118 and arranged between the bifurcations of the lever 244 is a plate 254 having a face 256 which is inclined to the face 250 of the outer sleeve 222 and is engaged by the roller 248. As the outer sleeve 222 is depressed by forcing it downward against the action of the spring-pressed plunger 226 to force the lower end of the plunger 236 against the heel positioned in the machine the flat face 250 of the sleeve 222 travels along the roll 248. When downward pressure against the hand grip 230 is released the roll 248 acting between the inclined face 256 of the plate 254 and the face 250 of the sleeve 222 prevents upward or retractive movement of said sleeve. Further clamping pressure against the positioned heel is effected by rotating the hand grip 230 and accordingly the inner sleeve 234 to force with heavy pressure the plunger 236 against the heel. By providing the above-described clamp 54 heels of different heights may be quickly and effectively forced against the tread ends of heels positioned in the machine. After the heel 32 has been cross slotted the lever 244 is swung counterclockwise as viewed in Fig. 10 against the action of the spring 252 to release the outer sleeve 222 thereby permitting it to be moved to its raised starting position by the spring-pressed plunger 226.

As above explained, the bracket 68 (Figs. 1, 2 and 3), which serves as an indirect mount for the circular saw 78 and the means for rotatably supporting and operating the saw, has secured to it by the set screws 66 the bearing pins 64 which are supported in the bores 62 of the flanges 60 of the base plate 38, the bracket being secured by the screws 81 to said flanges in different angular positions about the axis 79 of the pins. The bracket 68 comprises upper and lower parts 68a, 68b, respectively, secured together by screws 258 which are threaded into the upper part of the bracket and pass through elongated slots 260 in the lower portion of the bracket, the construction and arrangement being such that the guide rods 70, 70a can be initially adjusted in the direction indicated by the double headed arrow 262 (Fig. 2) for the purpose of slightly shifting if necessary the path of reciprocation of the saw 78 so that said saw shall pass without interference through the X-shaped opening 108.

Pinned to the lower end of the guide rod 70 is a bearing block 264 and slidingly mounted upon the guide rods 70, 70a are boss portions 72a (Fig. 2), 72b (Fig. 1) of the slidable carriage 72, said rods serving as a support and a guide for said carriage upon which, as above explained, are mounted the saw 78 and the mechanism for operating and driving the saw. The electric motor has a base 80a which may be secured in different adjusted positions to an upstanding flange of the carriage 72 by screws 266 (Fig. 2) which are threaded into said flange and pass through elongated slots 268 formed in said base. Keyed to a shaft 270 of the motor 80 is a lower pulley 272 operatively connected by a belt 274 to an upper pulley 276 secured to the shaft 76 which, as above explained, is rotatable in the bearing 74 of the carriage and has secured to it the saw 78.

Threaded into the bearing block 264 (Figs. 1 and 2), which as above explained is pinned to the lower end of the guide rod 70, is a shoulder screw 278 upon which is mounted a lever 280, front and rear ends of which are pivotally connected to the lower end of a link 282 and to the upper end of a treadle rod 284. The upper end of the link 282 is pivoted upon a shoulder screw 286 threaded into the boss 72a of the carriage 72. Fulcrumed at its rear end to the table 42 is the treadle 82 which is pivotally connected to the lower end of the treadle rod 284, depression of the treadle being effective to cause the carriage 72 to be raised along the guide rods 70, 70a.

Secured to the carriage 72 by screws 288 (Fig. 2) is a normally closed switch or microswitch 290 (Figs. 2 and 11) having a switch bar 292 which is constantly urged across terminals 294 of said microswitch by a spring 296. The carriage 72 has secured to it by screws 298 a lug 300 having a bore 302 in which slides a shouldered pin 304 to the upper end of which is secured by a nut 306 a floating bar 308, said bar and said pin being constantly urged by a spring 312 to raised positions in which a lower head 310 of the pin engages the lug. The floating bar 308 has a forward end in sliding relation with a slot 314 formed in the lug 300 and has threaded into its rear end a trip screw 316 which may be initially adjusted in the bar.

Secured by screw 318 to the bracket 68 is a boss 320 and a scale 322, said boss having a threaded bore 324 for receiving a screw 326 which may be rotated into different adjusted positions along said bore. In order to set the screw 326 in an adjusted position in the bore 324 said boss is preferably split, portions of the boss being clamped against the screw by a binder screw 328. Threaded onto the screw 326 and held in its adjusted position on said screw 326 by a locknut is a collar 330 which may be moved into different adjusted positions along a calibrated edge of the scale 322.

It is customary to present the heel 32 to be slotted to the turret 48 arranged in the same indexed position in which it was left when the last slot was formed in the preceding heel. It is desirable to insure against rotation of the saw 78 until after the heel 32 has been positioned and clamped in the turret 48 since the saw in its lowered position is commonly arranged just below the X-shaped opening 108 which in order to accommodate heels of different sizes is fairly large and through which a corner of the heel being placed in the machine is sometimes accidentally dropped. With the above considerations in view it is desirable that the saw 78 shall remain at rest until the operator by positive action is ready to raise said saw for operation after positioning and clamping the heel in the machine.

At the time the heel 32 is positioned and clamped in the machine (Fig. 11) the switch bar 98 is held depressed against the action of the spring 104 by the plunger 92 or 192, said bar bridging the terminals 106, the switch bar 292 at such time being held in bridging position across the terminals 294 of the limit switch 290. Before energizing a coil 332 of a motor starting relay 334 is necessary for the operator to lift the spring-pressed plunger 92 or 192 thus allowing the switch bar 98 to be moved by the spring 104 across terminals 336 to energize a coil 338 of a holding circuit relay 340 and accordingly causing a switch bar 342 to bridge terminals 346 to establish a holding circuit 348 and causing a switch bar 344 to bridge the terminals 350 of a power relay circuit 352. The plunger 92 is thereafter released to cause it to move the switch bar 98 back across the terminals 106 to establish the power relay circuit 352 and thus to energize the coil 352 of the motor starting relay 334 with the result that switch bars 354 of such relay are moved across terminals 356 to start the motor 80.

When the motor 80 has been started the treadle 82 is depressed to raise the slidable carriage 72 so as to impart to the saw 78 a rectilinear or translatory movement in a path extending through the X-shaped opening 108 of the platen 58, said saw entering the attaching face of the heel positioned and clamped in the turret 48 to form one of the slots 34. As the carriage 72 continues to move upward the floating bar 308 engages the screw 326 causing, just before the bar engages the bottom of the slot 314, the switch bar 292 to be engaged and depressed by the trip screw 316 and rotation of the saw 78 and accordingly upward movement of the carriage 72 to cease. The screw 316 is so adjusted in the floating bar 308 that when said bar has been forced against the bottom of the slot 314 by the screw 326 the screw 316 has depressed the switch bar 292 to a slight extent against the action of the spring 296 and has moved said switch bar away from the terminals 294 thus deenergizing the coil 338 of the relay 340 and causing switch bars 342, 344 of said relay to be moved under the action of a tension spring 358 to their full line positions (Fig. 11) away from terminals 346, 350 in the holding circuit 348 and in the power relay circuit 352 respectively with the result that the coil 332 in the motor starting relay 334 is deenergized and the switch bars 354 of said relay are moved to their full line positions away from the terminals 356 of the relay by spring action. When the switch bars 354 have moved away from the terminals 356 the saw 78, which is then in its raised position, stops in the heel, further upward movement of said saw being rendered impossible. The treadle 82 is then released to allow the carriage 72 to move by gravity to its lower or retracted position shown in Fig. 2. As the carriage 72 is lowered the switch bar 292 moves away from the trip screw 316 and again assumes its bridging position across the terminals 294.

During the process of indexing the turret 48 preparatory to forming the second slot in the heel the plungers 92 or 192 of the turret are away from their registering positions in the recess 96 of the base plate 38 and accordingly the bar 98 is held by the spring 104 in engagement with the terminals 336 and away from the terminals 106 of the power relay circuit 352, thereby insuring against energizing the coil 332 of the motor starting relay 334. Accordingly, there is no danger of the saw 78 being damaged should the operator inadvertently step on the treadle 38 during the time when the turret is being indexed. With the foregoing in view it will be clear that once the saw 78 has stopped in the work it cannot be started again until the turret 48 is in one of its indexed positions and the operator has lifted the plunger 92 or 192 to enable the switch bar 98 under spring action to bridge the terminals 336 and has released said plunger to enable it to move into said recess to cause the switch bar to bridge the terminals 106.

Preparatory to slotting a quantity of heels by the use of the machine the operator makes the necessary initial adjustments, the screw 200 being rotated to the proper position to insure that the desired angle 2A shall be formed between the slots 34 and the screw 326 being rotated to the proper position to limit upward movement of the saw 78 to form slots of a predetermined depth. If desirable the bracket 68 may be angularly adjusted upon the base plate 38 to vary the general planes of the slots 34 with relation to the plane of the rim 37 of the attaching face 30 of the heel 32. After actuating the handles 178, 180 to open up the side and breast gages 140, 142 the operator places the unslotted heel upon the platen 58 with its rear end arranged against the rear gage 130, said handles then being released to effect by spring action the centralizing of the heel widthwise and the forcing of said heel against the rear gage. When the heel has been positioned in the machine the hand grip 230 is depressed to move the plunger 236 into engagement with the heel and is thereafter rotated to force said plunger with heavy pressure against the heel. The heel having been thus positioned and clamped in the machine the operator lifts one of the plungers 92, 192 and then releases it permitting it to drop back into the associated indexing recess 96 to cause the motor to start and then depresses the treadle 82 to raise the saw 78 to form the first slot 34 in the attaching face 30 of the heel. One of the plungers 92, 192 is thereafter raised from the recess 96 of the base plate 38 and the turret 48 is swung by the use of the handle 86 to its other indexed position where the other plunger registers in said recess, the saw which during the indexing movement has been temporarily stopped by the deenergizing of the coil 332 again being started when the switch bar 98 is moved back across the terminals 106. The treadle 82 is thereafter depressed causing the other slot to be formed in the attaching face of the heel, the saw coming to rest as above explained to limit its upward movement in the heel. After releasing the treadle 82 to permit the saw 78 to drop to its lowered or retracted position the operator releases the slotted heel and removes it from the machine preparatory to operating upon another heel.

Having thus described our invention, what we claim as new and desire to secure by Letters Patent of the United States is:

1. In a machine for slotting heels, a rotatable cutter, means for rotating the cutter, a support having an interlocking part, a turret comprising a unit for positioning and clamping a wood heel, said turret having a pair of spaced interlocking parts and being mounted for movement about an axis to enable said interlocking parts of the turret to be moved alternately into interlocking relation with said interlocking part of the support and accordingly to cause the turret to be indexed to two positions, means for effecting translatory movement of the cutter to form slots in the heel positioned and clamped in the turret in said two indexed positions, and means for initially relatively adjusting in the same direction about said axis with relation to one of the interlocking parts of the turret the heel positioning and clamping unit of the turret and the other interlocking part of the turret, the construction and arrangement of said last-named means being such that said other interlocking part of the turret has as a result of such adjustment an angular displacement twice that of said unit.

2. In a machine for slotting heels, a rotatable cutter, means comprising a motor for rotating the cutter, a support having an interlocking part, a turret comprising a unit for positioning and clamping a wood heel, a microswitch which is associated with the interlocking part of the support and controls the operation of said motor, said turret having a pair of spaced interlocking parts and being mounted upon the support for indexing movement about an axis to enable its interlocking parts and its heel positioning and clamping unit to be moved as an entirety alternately into interlocking relation with said interlocking part of the support and to close said microswitch thereby effecting operation of the motor and accordingly rotation of the cutter, means for effecting translatory movement of the saw to form slots in the heel positioned and clamped in the indexed turret, and means for relatively adjusting initially about said axis and in the same direction with relation to one of the interlocking parts of the turret the heel positioning and clamping unit of the turret and the other interlocking part of the turret, the construction and arrangement of said last-named means being such that said other interlocking part has as a result of such adjustment an angular displacement twice that of said unit.

3. In a machine for slotting heels, a support, a bracket which is secured to the support and is initially adjustable upon said support about an axis, a carriage mounted for reciprocation upon the bracket, a circular saw and means for operating it mounted upon the carriage, a turret mounted upon the support, means for positioning the attaching face of a heel in the turret and for clamping said positioned heel to said turret, means for indexing the turret to predetermined positions upon the support, and mechanism for moving the carriage and accordingly the saw in a rectilinear path disposed at right angles to said axis with the general plane of the saw arranged approximately in a plane including said axis to form a slot in the attaching face of the heel.

4. In a heel slotting machine, a circular saw, means for rotating the saw, a fixed support, a turret mounted upon the support, means for positioning and clamping a heel in the turret, means for effecting translatory movement of the saw in a predetermined path to form a slot in the heel, means for indexing the turret into predetermined positions upon the support to vary the positions of the slots formed in said heel, means for stopping rotation of the saw and accordingly translatory movement of the saw when said saw has penetrated a predetermined distance into the heel, a manually actuated member, and means for insuring against rotation of the stopped saw until said member has been actuated and for insuring against rotation of the saw when the turret is away from one of its indexing positions.

5. In a heel slotting machine, a support, a ring rotatable upon the support for movement about an axis, a heel positioning and clamping carrier secured to the ring and initially adjustable about said axis with relation to said ring, said support having an interlocking part, an index arm which is mounted for indexing movement together as a unit with said ring and said carrier and which is initially adjustable about said axis with relation to said ring and said carrier, interlocking parts which are carried by the ring and the index arm respectively and are constructed and arranged to interlock in succession with the interlocking part of the support to establish the indexed positions of the carrier and to retain said carrier in said positions, and mechanism for operatively connecting said ring, said carrier and said index arm together for movement as a unit and for causing in initially setting up the machine, the carrier to be displaced a given number of degrees in one direction about an axis with relation to the ring, as the index arm is displaced with relation to the carrier, twice said given number of degrees in the same direction about said axis.

6. In a heel slotting machine, a support constructed and arranged to be engaged by the rim of the attaching face of a heel, means for positioning the heel upon the support, means for clamping the positioned heel against the support, a circular saw, and mechanism for effecting relative translatory movement of the saw on the one hand and said support and said means on the other hand to form a slot in the attaching face of the heel, said support and said means on the one hand and said saw on the other hand being mounted for relative movement into different indexing positions about an axis which extends generally heightwise of the positioned heel to vary the angular position of the slot in the attaching face of the heel.

7. In a heel slotting machine, a fixed support, a multipart turret comprising a platen which is engaged by the rim of the attaching face of a heel and has an opening bridged by said heel, means for positioning the heel upon said platen, means for clamping said positioned heel upon the platen, said turret and said means being angularly adjustable as a unit upon the support about an axis disposed at right angles to said platen to move the positioned and clamped heel into different positions to be operated upon, a rotary saw mounted for translatory movement in a fixed path extending through said opening in the platen to form a slot in the attaching face of the heel, a pair of plungers carried by the turret, a recess formed in the support, and mechanism for rotating relatively to the support in the same direction about said axis for purposes of initial adjustment the plungers, the platen and the heel positioning and clamping means, said mechanism being constructed and arranged to impart to one of said plungers an angular displacement twice that of the other plunger thereby changing the indexed positions of the turret which positions are determined by the alternate register of said plungers in said recess.

8. In a heel slotting machine, a support having a recess, a rotatable circular saw, means comprising a microswitch which is positioned in said recess and displacement of which effects rotation of the saw, a ring which is mounted upon the support for rotation about an axis and carries a plunger adapted when the ring is in a predetermined position to move into said recess and to displace said microswitch, a heel positioning and clamping unit which is mounted upon and secured to said ring and may be initially rotated about said axis into different operating positions upon the ring, an arm which is operatively connected to said ring and carries a plunger adapted when the ring is in another predetermined position to move into said recess and to displace said microswitch, mechanism for angularly moving the heel positioning and clamping unit upon said ring and about said axis into different adjusted positions in one direction and for simultaneously angularly moving with relation to the ring about said axis the arm in said one direction through twice the angular displacement of the unit, means for effecting translatory movement of the circular saw to form a slot in the attaching face of a heel in said unit, a microswitch for stopping rotation of the saw to limit the depth of the slot formed in said heel, and safety means associated with the first-named microswitch and the saw for insuring against rotation of the saw while the turret is being indexed.

9. In a heel slotting machine, a fixed support, a member which is carried by and is angularly adjustable upon the support about an axis, a work carrier which is angularly adjustable about said axis into different operative positions upon said member, said support having formed in it a first interlocking part, a second interlocking part which is carried by said member and is cooperative with said first interlocking part, an arm mounted upon said member, a third interlocking part which is carried by said arm and is cooperative with said first interlocking part, and mechanism for operatively connecting the arm to said work carrier and to said member, said mechanism for purposes of initial adjustment being constructed and arranged angularly to displace in one direction or the other about said axis, said work carrier with relation to said member and to displace said arm about said axis with relation to said member through twice the distance and in the same direction that the work carrier is displaced upon said member.

10. In a heel slotting machine, a support, a ring mounted upon the support for movement about an axis, a carrier mounted upon the ring for indexing movement together with the ring about said axis and for adjustment with relation to the ring about said axis, said carrier comprising a platen provided with an opening and means for positioning and clamping a heel with the rim of its attaching face in engagement with said platen, a rotary circular saw mounted for translatory movement through said opening in a fixed path inclined to the general plane of the rim of the attaching face of the heel mounted upon and clamped to said platen, said support having formed in it a recess, a microswitch which is positioned in said recess and when depressed closes said microswitch to effect rotation of the circular saw, a plunger carried by the ring, a plunger operatively connected to the ring and to the carrier, said plungers being moved alternately into said recess to secure said carrier in two indexed positions, and means for effecting said translatory movement of the rotating saw in said path when the carrier is in each of said indexed positions to form cross slots in said attaching face of the heel.

11. In a heel slotting machine, a fixed table, a ring mounted upon the table for indexing movement about an axis, a heel positioning and clamping unit which is secured for indexing movement together with the ring and is mounted for initial adjustment about said axis upon said ring, an extension arm operatively connected to said unit and to said ring, means for initially adjusting about said axis and in either direction said unit through a predetermined angle relatively to the ring and for adjusting about said axis and in the same direction that said unit is adjusted said arm with relation to said ring but through twice said predetermined angle, a latch part carried by the table, and latch parts which are carried by the ring and the extension arm and which are constructed and arranged successively to cooperate with the latch part of the table to establish predetermined indexed positions of said unit and to retain said unit in said indexed positions.

12. In a heel slotting machine, a fixed table, a ring mounted upon the table for indexing movement about an axis, a heel positioning and clamping unit which is secured for indexing movement together with the ring and is mounted for initial adjustment about said axis upon said ring, an extension arm operatively connected to said unit and to said ring, means for initially adjusting through a predetermined angle about said axis said unit with relation to said ring and simultaneously therewith and in the same direction through the same predetermined angle about said axis the extension arm with relation to said unit, a latch part carried by the table, and latch parts which are carried by the ring and the extension arm and which are constructed and arranged successively to cooperate with the latch part of the table to establish predetermined indexed positions of said unit and to retain said unit in its indexed positions.

13. In a heel slotting machine, a fixed table, a ring mounted upon the table for indexing movement about an axis, a heel positioning and clamping unit rotatable with the ring and mounted for initial adjustment upon said ring about said axis, an extension arm operatively connected to said unit and to said ring, mechanism for initially adjusting in one direction about said axis said unit through a predetermined angle relatively to the ring and for simultaneously therewith initially adjusting in the same direction about said axis and with relation to said ring the arm through twice said predetermined angle, a latch part formed in the table, latch parts which are carried by the ring and the arm respectively and are constructed and arranged successively to cooperate with the latch part of the table to establish indexed positions of said heel positioning and clamping unit, said unit comprising a platen having a recess and a face which surrounds said recess and is constructed and arranged to be engaged by the rim of the attaching face of a heel, a bracket, a rotary circular saw and operating mechanism therefor which are supported by and are guided for movement in a rectilinear path upon the bracket, said bracket being angularly adjustable upon the table about an axis extending approximately along said heel engaging face of the unit and lying generally in the path of movement of the circular saw.

14. In a heel slotting machine, a fixed table, a turret member mounted upon the table for indexing movement about an axis, a heel positioning and clamping unit rotatable with the turret member and mounted for initial adjustment about said axis upon said member, an extension arm operatively connected to said unit and to said turret member, mechanism for initially adjusting said unit in one direction about said axis through a predetermined angle with relation to the turret member and for simultaneously therewith initially adjusting in the same direction about said axis and with relation to said turret member the extension arm through twice said predetermined distance, a latch part formed in the table, latch parts which are carried by the turret member and the extension arm and are constructed and arranged successively to cooperate with the latch part of the table to establish index positions of said heel positioning and clamping unit, a rotary circular saw, means comprising a motor for rotating the saw, means for effecting translatory movement of the saw in a predetermined path successively to form cross slots in the heel in its two index positions, a switch for controlling operation of the motor and accordingly the saw, means for opening said switch when the saw has moved a predetermined distance along said path thereby causing rotation and accordingly movement of the saw in said path to cease, and means comprising a second switch associated with the latch part on the table for causing said motor to remain inactive when the turret member and the heel positioning and clamping unit are being indexed and until actuation of said second switch by the latch parts of the ring or the extension arm.

15. In a heel slotting machine, a table having a cylindrical bore, a ring mounted in said bore for angular indexing movement about an axis of the bore, a heel positioning and clamping unit secured to said ring, an arm, journals pivoted to said ring and to said arm respectively, a screw which is threaded into one of the journals and is coupled rotatably to the other journal, a radial guideway formed in said unit, a stud slidingly fitting in the guideway, links of equal lengths which are pivoted to the journals respectively and to the stud, concentric slots and guides which are formed in the unit and said arm and in which the journals respectively fit slidingly, a recess formed in the table, spring-pressed plungers which are carried by the ring and the arm respectively and are constructed and arranged to be selectively moved into the recess of the table to establish the desired indexed position of the heel positioning and clamping unit and to hold said unit thus indexed, said unit and said arm for purposes of initial adjustment being constructed and arranged upon rotation of the screw to move X and 2X degrees respectively in the same direction with relation to the ring.

JOHN W. ASHLEY.
JAMES F. LEAHY.

No references cited.